United States Patent Office 2,951,090
Patented Aug. 30, 1960

2,951,090
PREPARATION OF DL-GLUTAMINE

Ludwik Ujejski, Montreal, Quebec, and Kenneth M. Gaver, Preville, Montreal, Quebec, Canada, assignors to The Ogilvie Flour Mills Co., Ltd., Montreal, Quebec, Canada, a corporation of Canada No Drawing. Filed Apr. 17, 1958, Ser. No. 729,067

4 Claims. (Cl. 260—534)

The invention disclosed and claimed in this application relates to new processes of producing glutamine synthetically.

Glutamine is an optically active amino acid having a structural formula of

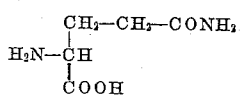

or ($C_5H_{10}O_3N_2$). It occurs naturally and is valuable in therapy but the process of obtaining it from natural sources is relatively expensive.

It has been proposed that glutamic acid which is relatively inexpensive and resembles glutamine might also be useful in the treatment of epilepsy and mental retardation. However, it has been shown experimentally that an increased level of glutamic acid in affected neurons does not compensate for or overcome the defective metabolism because it fails to penetrate the blood brain barrier. Glutamine on the other hand has been shown to penetrate the blood brain barrier and cell membrane readily and it has been administered to epileptic patients with promising results. These results are an apparent confirmation clinically of results obtained in vitro on epileptogenic brain tissue. Certain metabolic studies also promise wide applications of glutamine in different fields of therapy.

One of the objects of our invention is the synthetic preparation of glutamine at relatively low cost.

Other objects and features of our invention should be apparent from the following description and claims.

We have discovered that we can produce DL-glutamine synthetically, efficiently and economically. We mix glutamic acid with phthalic anhydride and heat to condense to obtain phthaloyl glutamic acid and water. We then mix the phthaloyl glutamic acid with acetic anhydride to form phthaloyl-DL-glutamic acid anhydride. We then combine with ammonia in an aqueous solution to form phthaloyl-DL-glutamine. Finally we remove the bivalent phthaloyl radical with phenylhydrazine and tri-n-butylamine to form the DL-glutamine.

The equations of the reactions involved in the above steps are believed to be:

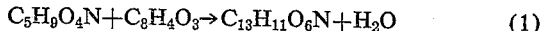
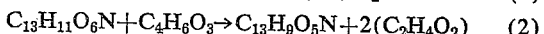
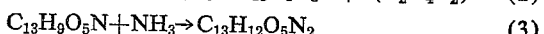
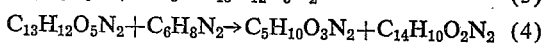

EXAMPLE I
*Preparation of phthaloyl-DL-glutamic acid anhydride*

500 gms. of glutamic acid —$C_5H_9O_4N$— (3.4 mole) and 500 gms. of phthalic anhydride —$C_8H_4O_3$— were placed in a stainless steel kettle which was provided with a snugly fitting agitator and was heated by an electric heating mantle. The apparatus was connected to a suction line. The temperature was raised to 165° C. for one hour. The melt was cooled to 108° C. Then 600 ml. of acetic anhydride —$C_4H_6O_3$— were added and the temperature was held at 100° C. for 15 minutes.

The mixture was cooled down to approximately 50° C. Thereafter 1800 ml. of xylene were added and the mixture was then poured into a container and put in the refrigerator over night. There was a yield of 60.9% of phthaloyl-DL-glutamic acid anhydride ($C_{13}H_9O_5N$) (2).

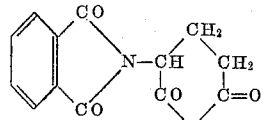

EXAMPLE II
*Preparation of phthaloyl-DL-glutamine*

500 gms. of phthaloyl-DL-glutamic acid anhydride were added by small portions to 4250 ml. of a 1 N solution of ammonia in ethanol with constant stirring. After complete solution the ethanol was removed by concentration under reduced pressure. The residue was dissolved in 1700 ml. of water. The solution was acidified with a 2 N solution of hydrochloric acid, cooled to 0°, and we obtained a yield of 85% of phthaloyl-DL-glutamine ($C_{13}H_{12}O_5N_2$) (3).

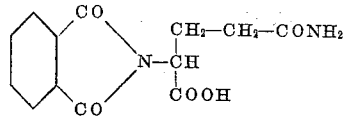

EXAMPLE III
*Preparation of DL-glutamine*

552 gms. of phthaloyl glutamine, 400 cc. of phenylhydrazine and 580 cc. of tri-n-butylamine were placed in a jar in 300 cc. of 96% ethanol and let stand for 24 hours at room temperature.

After that time, 900 cc. of methyl-ethyl-ketone and 120 cc. of glacial acetic acid were added. The mixture then was cooled in the refrigerator. The precipitate was stirred in ethanol several times until the yellow color (excess of phenylhydrazine) disappeared. The yield of the raw product (crude glutamine) was 90%.

135 gms. of the crude glutamine so obtained were dissolved in 3000 ml. of water under stirring at room temperature.

After solution 10 gms. of carbon were added, filtered, and evaporated in vacuo at 25° C. to the volume of 1000 cc. This oversaturated solution crystallized after cooling, and the first portion of crystals was collected. The supernatant was then evaporated further, until maximum precipitation of glutamine occurred.

The overall yield of DL-glutamine obtained by the described above procedures is 46.5%.

By the above described procedures, we obtained an overall yield of 46.5% of theoretical of DL-glutamine ($C_5H_{10}O_3N_2$) (4).

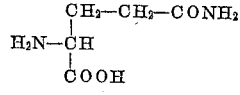

UTILITY

Glutamine is useful as a therapeutic agent, as a nutrient, and as an intermediant in the synthesis of various other therapeutic agents and nutrients. Glutamine has been effective in many clinical tests in relieving epileptic fits, in raising the IQ or mental response in the case of mental retardation and is being used experimentally for those ills. It is an active ingredient used in the preparation of Salk vaccine against polio.

The intermediate products produced in the processes are useful as intermediates in our process of producing glutamine.

Throughout this typed specification and in the claims following, we have used DL with double underscoring to indicate small caps roman in printing.

It is to be understood that the above described embodiment of our invention is for the purpose of illustration only and various changes may be made therein without departing from the spirit and scope of our invention.

We claim:

1. A process of producing glutamine which comprises reacting phthaloyl-DL-glutamine in solution in substantially non-aqueous ethanol with phenylhydrazine in the presence of an organic base.

2. In a process of producing glutamine from phthaloyl glutamic acid in which phthaloyl glutamic acid is dehydrated with acetic anhydride to form phthaloyl DL-glutamic acid anhydride, the phthaloyl DL-glutamic acid anhydride is combined with ammonia to form phthaloyl DL-glutamine, and the phthaloyl-DL-glutamine is reacted to produce DL-glutamine, the improvement in the last step which comprises mixing the phthaloyl-DL-glutamine with phenylhydrazine in solution in substantially non-aqueous ethanol in the presence of tri-n-butylamine whereby the phthaloyl-DL-glutamine reacts with the phenylhydrazine to produce DL-glutamine.

3. In a process of producing glutamine from phthaloyl DL-glutamic acid anhydride in which the phthaloyl DL-glutamic acid anhydride is combined with ammonia to form phthaloyl DL-glutamine, and the phthaloyl DL-glutamine is reacted to produce DL-glutamine, the improvement in the last step which comprises mixing the phthaloyl DL-glutamine with phenylhydrazine in solution in substantially non-aqueous ethanol in the presence of tri-n-butylamine whereby the phthaloyl DL-glutamine reacts with the phenylhydrazine to produce DL-glutamine.

4. In a process of producing glutamine from glutamic acid wherein glutamic acid is mixed and heated with phthalic anhydride to obtain phthaloyl glutamic acid, the phthaloyl glutamic acid thus obtained is dehydrated with acetic anhydride to form phthaloyl-DL-glutamic acid anhydride, the phthaloyl-DL-glutamic acid anhydride thus obtained is combined with ammonia to form the phthaloyl DL-glutamine, and the phthaloyl-DL-glutamine is reacted to produce DL-glutamine, the improvement in the last step which comprises mixing phthaloyl-DL-glutamine with phenylhydrazine in solution in substantially non-aqueous ethanol in the presence of tri-n-butylamine whereby the phthaloyl-DL-glutamine reacts with the phenylhydrazine to produce DL-glutamine.

References Cited in the file of this patent
UNITED STATES PATENTS 2,846,469     Carron et al.     Aug. 5, 1958

OTHER REFERENCES

King et al.: Jour. Chem. Soc. (London), pp. 3315–18 (1949).

Chem. Abstracts, vol. 48, p. 4441 (1954), citing Boissonnas et al., Helv. Chim. Acta, vol. 36, pp. 875–886 (1953).